United States Patent [19]
Doerfer et al.

[11] 3,771,196
[45] Nov. 13, 1973

[54] LOIN KNIFE MECHANISM

[75] Inventors: Richard F. Doerfer, Waterloo; Homer N. Leymaster, Cedar Falls; Richard R. Neebel, Waterloo, all of Iowa

[73] Assignee: Doerfer Corporation, Cedar Falls, Iowa

[22] Filed: Sept. 9, 1971

[21] Appl. No.: 178,913

[52] U.S. Cl. ..................................... 17/1 R, 17/23
[51] Int. Cl. .............................................. A22b 5/20
[58] Field of Search .................................... 17/1, 23

[56] References Cited
UNITED STATES PATENTS

| | | | |
|---|---|---|---|
| 3,546,737 | 12/1970 | Neebel et al. | 17/1 R |
| 3,159,869 | 12/1964 | Vogt et al. | 17/1 R |
| 3,533,131 | 10/1970 | Ivarsson | 17/23 |
| 2,832,410 | 4/1958 | Soss | 17/1 R |

Primary Examiner—Louis G. Mancene
Assistant Examiner—D. L. Weinhold
Attorney—Seymour Rothstein et al.

[57] ABSTRACT

An animal processing machine including a loin knife mechanism constructed and arranged so as to optimize the loin cut from the animal side. The animal side processing machine includes carriage means supporting a scribe saw and a U-shaped loin pull knife. The carriage means movement is controlled to manipulate the scribe saw and U-shaped loin pull knife to automatically cut the loin. In use, the carriage means is moved laterally of the conveyor to squeeze and bias the loin pull knife during operation to thereby provide a suitable cut of the fatback at the tail end of the animal side so as to optimize the loin cut from the animal side.

10 Claims, 8 Drawing Figures

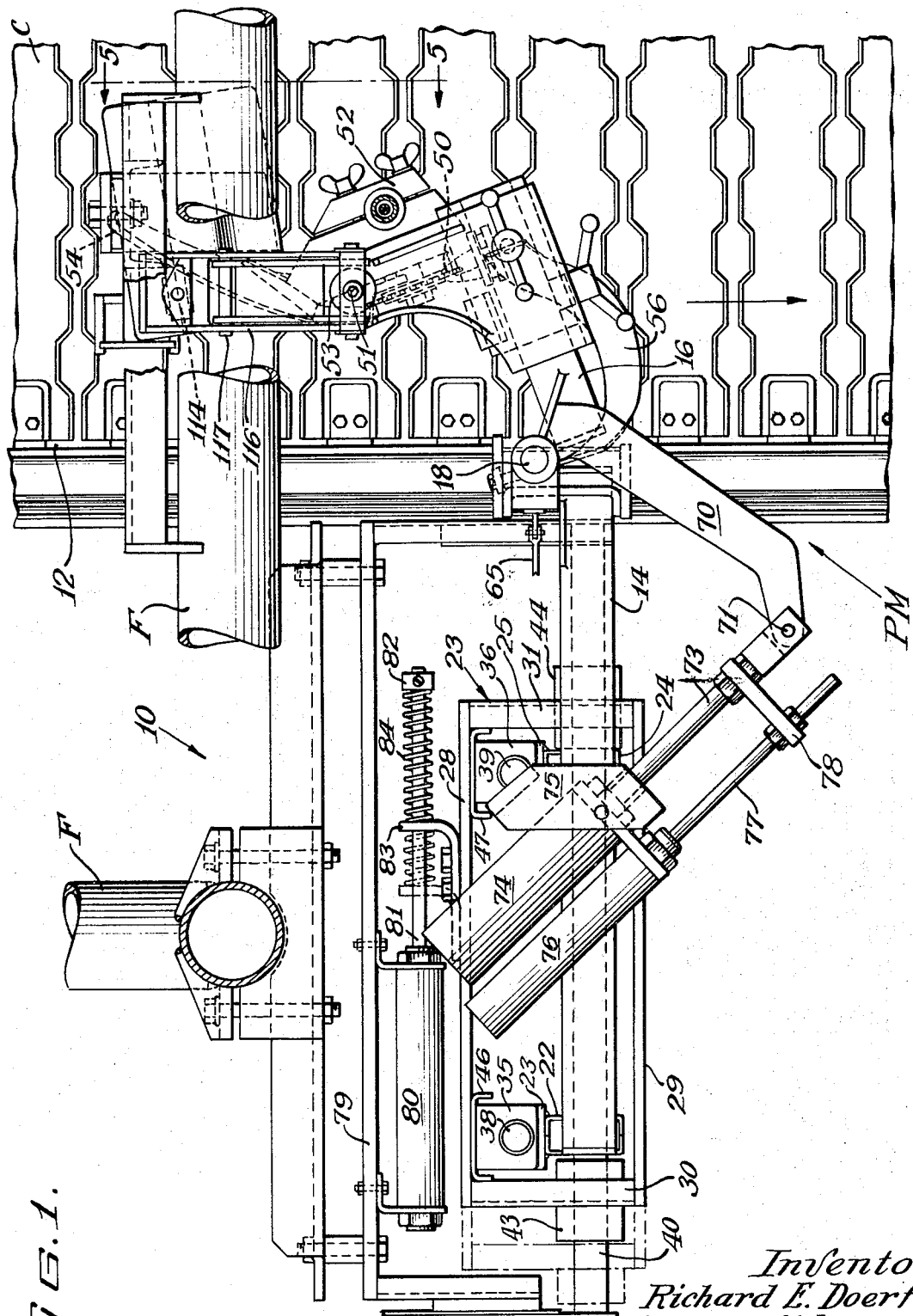

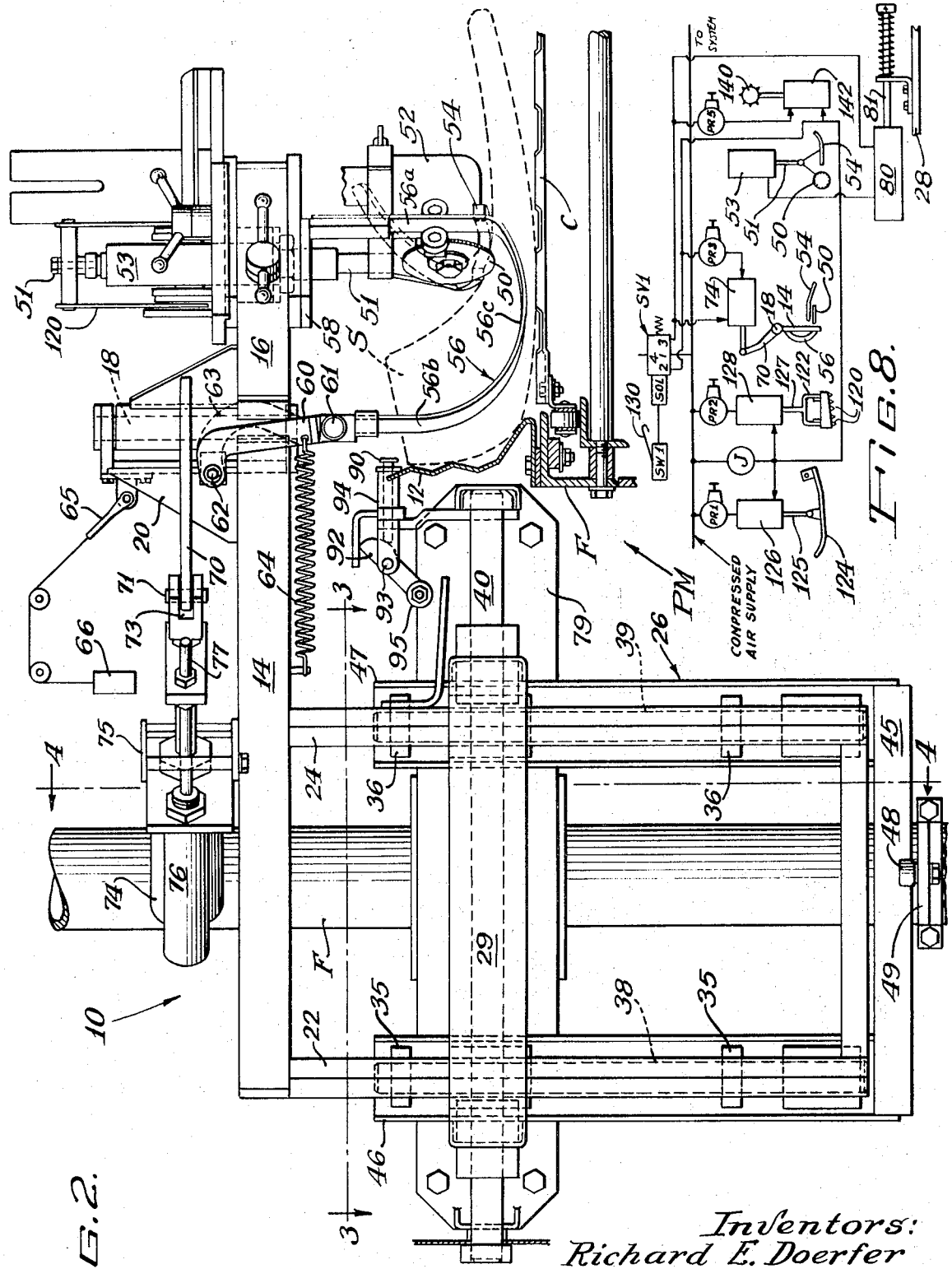

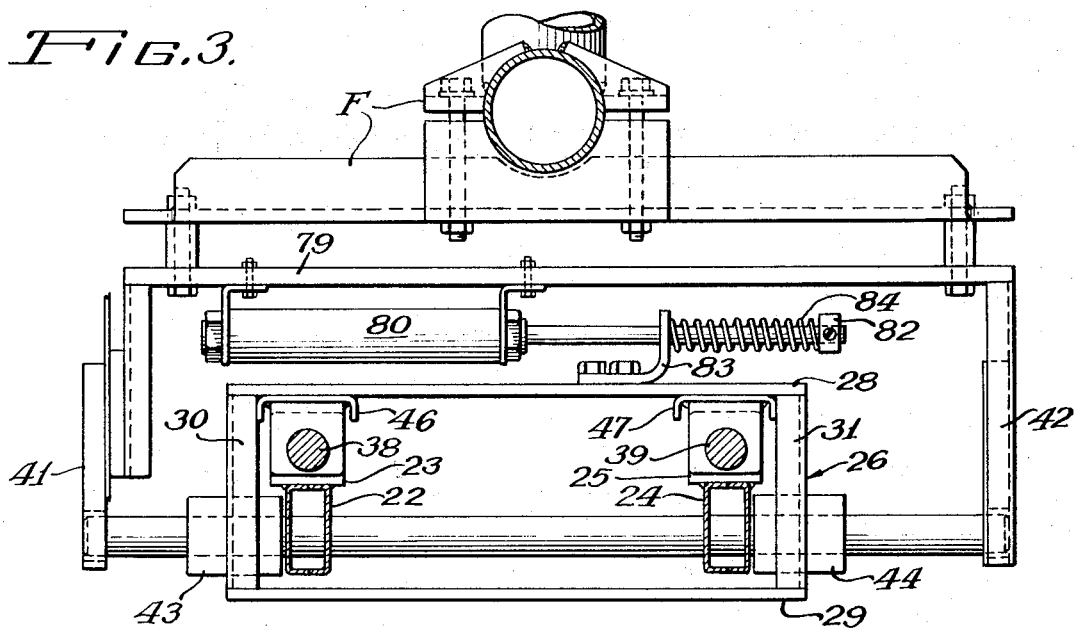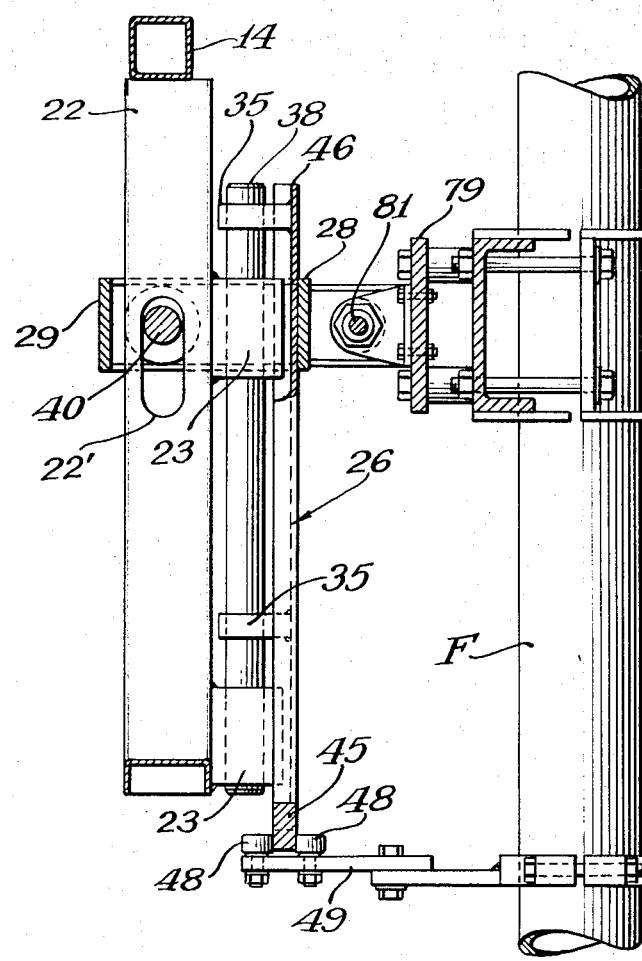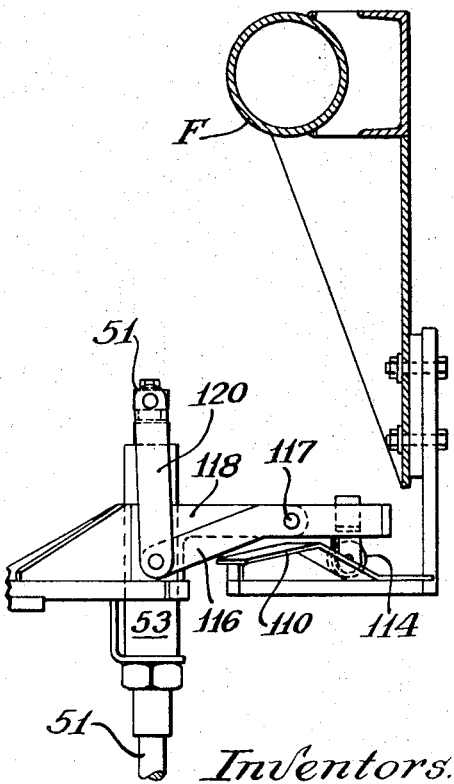

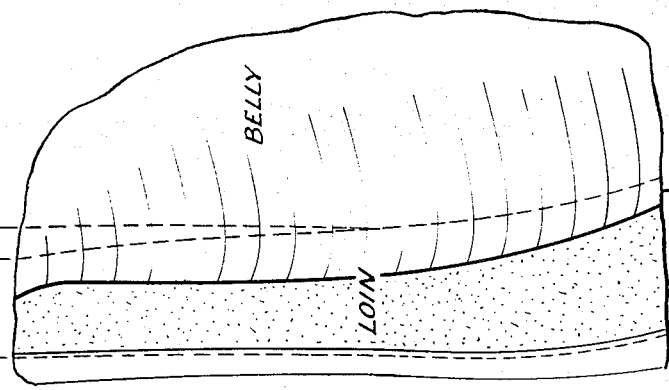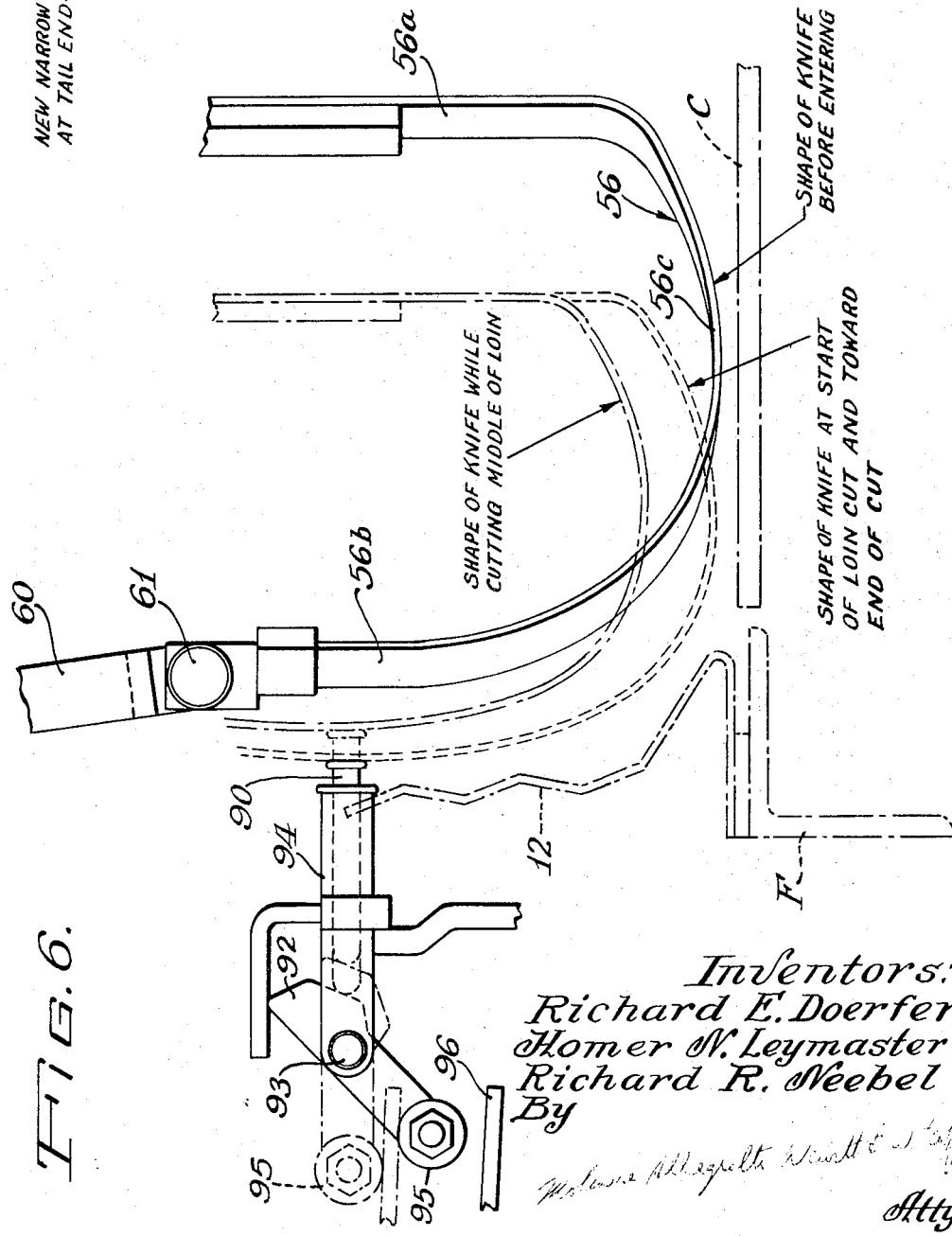

3,771,196

LOIN KNIFE MECHANISM

BACKGROUND OF THE INVENTION

This invention relates to an animal side processing machine and more particularly, an improved loin knife mechanism for optimizing the loin cut from an animal side.

There is shown in U.S. Pat. No. 3,546,737, granted Dec. 15, 1970 to the same inventors as the present invention, a machine for automatically removing the loin and ribs from the side of a hog. Hogs are not uniform in size and contour when they are butchered. The animal side processing machine of U.S. Pat. No. 3,546,737 yields quite uniform results through a combination of averaging and exact contour following. A scribe saw first encounters the animal side and separates the main rib section from the backbone. This is followed by a U-shaped loin pull knife which enters the side on the basis of average configuration. After automatically jumping over the shoulder bone and shifting its cutting angle several degrees, the loin pull knife actually conforms to the interior contour of the individual hog. The loin is automatically ejected from the machine. Subsequently, at another cutting station, the ribs are separated from the belly. The ribs are consumed as spare ribs and the bellies ultimately become bacon.

It has been found that if a larger portion of fat than is necessary is left at the end of the loin cut from an animal side, the whole loin may be downgraded and, therefore, be less valuable. Thus, it is desired to improve the animal side processing machine by providing a loin knife mechanism that will not only follow the contour of the animal side to maximize the loin removed, but will also provide desired cutting action so as to optimize the loin cut from the animal side, particularly at the end of the loin cutting operation.

A primary object of the present invention is to provide an improved animal side processing machine having a loin knife mechanism which incorporates a carriage structure therein that is operable to position and move the U-shaped loin pull knife so as to optimize the quality of a loin removed from the animal side, without downgrading the remainder of the animal side.

Another object of the present invention is to provide an improved loin knife mechanism for an animal side processing machine, the loin knife mechanism including movable carriage means supporting a scribe saw and a U-shaped loin pull knife, with control means for moving the carriage means relative to the main frame so as to squeeze the arm portions of the U-shaped loin pull knife in use to optimize the quality of the loin removed from the animal side.

Yet another object of this invention is to provide an improved animal side processing machine including a loin knife mechanism having a U-shaped loin pull knife that is squeezed in operation and biased to thereby provide a suitable cut at the tail end of the animal side so as to optimize the loin cut from the animal side, thereby upgrading the loin without adversely affecting the remainder of the animal side. Other objects and advantages of the present invention will become more apparent hereinafter.

BRIEF DESCRIPTION OF THE DRAWINGS

There is shown in the attached drawings a presently preferred embodiment of the present invention wherein like numerals refer to like elements in the different views, and wherein:

FIG. 1 is a plan view of an animal side processing machine, particularly showing the loin knife mechanism embodying principles of the present invention;

FIG. 2 is an elevation view of the loin knife mechanism;

FIG. 3 is a detail cross-sectional view of the loin knife mechanism taken generally along the line 3—3 of FIG. 2;

FIG. 4 is a detail sectional view of the loin knife mechanism taken generally along the line 4—4 of FIG. 2;

FIG. 5 is a detail sectional view of the loin knife mechanism taken generally along the line 5—5 of FIG. 1;

FIG. 6 is an elevation view illustrating the cooperation and relative positions of the U-shaped loin pull knife and stop means on the main frame during loin pulling operation;

FIG. 7 is a cross-sectional view of an animal side illustrating the loin cut therefrom utilizing the present invention; and FIG. 8 is a diagramatic view of a portion of the control system of the animal side processing machine illustrating the essential components of the loin knife mechanism.

DETAILED DESCRIPTION OF THE PRESENT INVENTION

Referring to FIGS. 1 and 2, there is illustrated a loin knife mechanism or loin pulling mechanism 10 embodying the principles of the present invention. The loin pulling mechanism 10 is part of an animal side processing machine PM for automatically performing loin pulling and rib cutting operations on hogs. The processing machine to which the present improvement is applicable is of the type shown in U.S. Pat. No. 3,546,737. Reference may be made to said U.S. Pat. No. 3,546,737 for further description of the operating structure of the processing machine. In this disclosure, only the portions of the entire machine needed to understand the functioning of the loin pull mechanism are disclosed. The main frame components are illustrated by the reference character F. Provided on the frame F is conveyor means C for receiving an animal side, for example, a pork side, and conveying same through the machine. The pork sides are positioned on the conveyor C with the backbone up and the thicker end thereof against the side rail 12 which is secured to the frame F. The backbone of the animal side lies substantially parallel to and in full-length contact with the side rail 12.

The loin pull mechanism comprises carriage means including a first frame 14 having a second frame 16 pivotally carried thereon for pivotal action about a generally vertical axis. Connected to the frame 16 is a shaft member 18 that is retained in a bracket 20 secured on the frame 14. The frames 14 and 16 are adapted to be carried for movement toward and away from the conveyor C. To this end, a pair of channel members 22, 24 depend from the frame 14 and are adapted to be vertically guided on a third frame 26. The third frame 26 comprises basically a rear support 28, a front support 29, and side supports 30, 31 suitably secured to one another, as well as angle members 46, 47 and cross-brace 45. Fixed in bracket members 35, 36 secured to angle members 46, 47 carried on the rear support 28 of the frame 26 are vertically extending rods 38, 39. Upper and lower brackets 35 retain the rod 38. Similarly, upper and lower brackets 36 retain the rod 39. Thus, channel members 22 and 24 are movable in a generally vertical plane relative to the generally horizontally disposed conveyor C. As will be more fully set forth hereafter, frame 26 is mounted on frame F for lateral motion relative to conveyor C.

Carried on the frame 16 is a loin scribe saw 50 driven by an angle drive head 52 that is suitably connected to a source of power carried on the main frame F. Depending from the support arm 51 which carries the scribe saw 50 and the angle drive head 52 is a scribe saw shoe 54 which is adapted to rest on the animal side and follow the contour of the backbone of the animal side so as to raise and lower the frame 16 and frame 14 secured thereto.

The loin pull knife 56 has an arm portion 56a affixed to a bracket 58 secured to the frame 16 and an arm portion 56b pivotally secured at 61 to a squeeze bracket weldment including spaced-apart arms 60, 63 that are pivoted as indicated at 62 on frame 14. Spring 64 biased the squeeze bracket weldment so as to urge the arm 56b to the left as viewed in FIG. 2, thereby squeezing the knife 56 against the rib portion of side S during cutting. The loin pull knife 56 includes a central curve portion 56c connecting the arm portions 56a and 56b.

The scribe saw shoe 54 is held down by the weight of the frames 14 and 16 and the components carried thereby and is pulled horizontally by a cable 65 terminating in a couterweight 66 shown diagramatically in FIG. 2. The angle of the cable 65 is such that a vertical as well as a horizontal pull is obtained, with the vertical pull involving the depending channel members 22, 24 sliding on the vertical guide rods 38, 39 and the horizontal pull involving the frame 26 sliding laterally on the main frame F. Thus, the counterweight 66 functions to offset the weight of the carriage means to provide for easier maneuverability and to pull the scribe saw shoe 54 against the upcurved portion of the ribs of the animal side S shown in dotted line in FIG. 2.

Control means are provided for pivoting the pivot frame 16 relative to the cutter support arm or frame 14 about the pivot axis through the shaft 18. Such control means include a lever 70 connected at one end to the frame 16 and at the other end pivotally connected about pivot 71 to the bracket 72 extending from the end of the rod 73 of fluid cylinder 74. The cylinder 74 is suitably secured by a bracket 75 to the frame 14. Cylinder 76 is operatively connected with the cylinder 74 through the cross-connection 78 between the rods 73 and 77 and functions as a dash pot for the cylinder 74. Cylinder 74 is actuated to move lever 70 and thereby move frame 16 relative to frame 14 so as to functionally position both the loin scribe saw 50 and the loin pull knife 56 for their cuts on the animal side.

The loin pull mechanism 10 includes actuating means for moving the third frame 26 relative to the main frame means F to cause the arm portions of the loin pull knife 56 to be moved toward one another during loin pull operation. The actuating means include a fluid cylinder 80 secured to a bracket 79 on the fixed main frame F. The piston rod 81 of the cylinder 80 has a spring 84 disposed thereon which is operative between a stop 82 on the end of the rod 81 and a bracket 83 which is connected to the third frame 26. When the cylinder 80 is actuated, the rod 81 is moved from the solid line position shown in FIG. 1 to the dotted line position and the frame 26 is moved to the dotted line position as illustrated to move the loin pull knife 56 laterally timed with the turning motion of the frame 16 relative to the frame 14 to squeeze the two legs 56a and 56b of the loin pull knife together, making a narrower cut of the animal side at the tail end and thus optimizing the loin cut from the animal side. More fat is shaved from the end of the loin than in previous loin pulling mechanisms, thus assuring maximizing of the quality of the cut loin.

Secured on the frame is a stop mechanism adapted to cooperate with the arm 56b of the loin pull knife 56 during operation. The stop mechanism includes a stop button 90 actuated by a cam 92 pivoted about the pivot 93 carried in the housing 94 which guides the stop botton 90 for rectilinear motion. A cam roller 95 on the end of the cam 92 is adapted to be engaged by an actuator arm 96 carried on the vertically movable support member 24 of the first frame 14. The stop button 90 cooperates with the arm 56b of the loin pull knife to control the amount of fat left on the loin.

Turning now to FIGS. 3 and 4, there is better illustrated the manner of mounting the third frame 26 on the main frame F. Channel members 22 and 24 are secured to brackets 23 and 25 that carry ball bushings therein that are slidably engaged with rods 38 and 39, respectively. The channel members 22, 24 and brackets 23, 25 are guided for vertical movement on the rods 38, 39. Cross-shaft 40 is secured at its ends in the inwardly facing channel members 41 and 42 carried on the main frame F. Secured in the sides 30 and 31 of the third frame 26 are bearings 43, 44 which journal the shaft 40. Thus, in response to movement of the piston rod 81, the third frame 26 may be moved laterally with respect to the conveyor C on main frame F. Cross brace 45 secures the bottom of the angle members 46 and 47 and is guided in the spaced-apart rollers 48 carried on the bracket 49 secured to the main frame F. By virtue of the cooperation of the shaft 40 and rollers 48, the lateral motion of the frame 26 is stabilized. It is to be noted from FIG. 4 that a slot 23 is provided in the upright channel member 22 of frame 26. A similar elongated slot is provided in the channel member 24. The slots permit limited up and down motion of the channel members 22, 24 and the frame 14 carried thereon. Since frame 16 is pivotal relative to frame 14 only about a vertical axis, it will be raised and lowered together with frame 14.

Referring now to FIG. 5, there is illustrated vertical positioning mechanism for the loin pull knife 56 which serves to lift the knife 56 at the moment coinciding with the position of the side when the shoulder has passed the knife. Knife 56 rises to follow the contour of side S and is then lowered to resume cutting the loin. Such mechanism includes a stationary cam track 110 carried on a bracket 112 secured to the main frame F. The roller 114 is carried by dual arms 116 pivoted at 117 on a bracket 118 carried by the frame 16 and is operatively connected by links 120 to the upper end of piston rod 51 of cylinder 53. The piston rod 51 acts normally as a supporting guide rod for the scribe saw 50 and the shoe 54. The cylinder 53 can be pneumatically actuated by the operation of a jam valve J (FIG. 8) for lifting the scribe saw 50 and the shoe 54.

The overall operation of the animal side processing machine PM and particularly the loin pull mechanism 10 may be better understood by reference to FIG. 6 where there is shown schematically pertinent components of the animal side processing machine. Reference for complete operation of the overall processing machine may be made to said U.S. Pat. No. 3,546,737. A pork side S is moved toward the cutting and sawing section of the machine by the conveyor C. Stud ponts 120 mounted on a gripper chain 122 hold down the side S and move it toward the scribe saw 50 and loin pull knife 56. The speed of the conveyor C and the gripper chain 122 are synchronized and a gripper chain rider arm 124 is inclined downwardly in the direction of travel to better hold the side S in a firm position as it reaches and passes through the loin scribe saw 50 and the loin pull knife 56. The rider arm 124 is forced down against the center of the animal side S by its own weight as well as by an adjustable pneumatic cylinder 126 acting through piston rod 125. Adjustment of the cylinder 126 is accomplished by supplying compressed air to the cylinder through an adjustable pressure regulator PR1. This action helps to position and hold the animal side S for better sawing and cutting action.

The pneumatic cylinder 128 acts upon the gripper chain 122 through a piston rod 127. Cylinder 128 also acts as an air spring, with a pressure regulator PR2 being provided therefor.

The initial position of the loin pull knife 56 is determined by the vertical and horizontal position of the scribe saw shoe 54. However, as the animal side S is moved along by the conveyor C, it depresses wire loop switch actuator 130 of microswitch SW1, which then functions to activate the cylinder 74 which repositions frame 16 relative to frame 14. The angle of the saw 50 and the knife 56 relative to the direction of conveyor travel are changed when switch SW1 opens solenoid valve SV1. The solenoid valve SV1 is a double acting type with spring return, supply inlet 1, normal outlet 2, operated outlet 3 and exhaust 4. The cylinder 53 is also under control of the switch SW1 and the solenoid valve SV1.

In changing from the initial position wherein the loin pull knife 56 is disposed at a diagonal with respect to the direction of travel of the conveyor, to a position where it is parallel to the direction of travel of the conveyor, the roller 114 passes over the hump of the cam track 110. Thus, a momentary lifting of the loin pull knife 56 is effected and it is then returned to its previous elevation but in its new direction of cutting action. This is necessary in order to follow the natural contour of the side S at that point. The scribe saw 52 and the loin pull knife 56 are now in a position to continue cutting down the length of the side S in the direction of the conveyor travel instead of diagonally. This change in cutting direction is necessary to accommodate the loin which is broader at the lead end than it is shortly thereafter. The result is first a curved saw cut path and then a straight saw cut path down the length of the side S.

As the frames 16 and 14 are pivoted with respect to one another, the cylinder 80 is actuated and the spring 84 carried on the cylinder rod 81 bears against the bracket 83 on the frame 26 to urge the frame 26 so as to squeeze the upper ends of the arms of the U-shaped loin pull knife. The spring 84 acts as a shock absorber and provides for a smooth build-up of the side force which squeezes the loin pull knife 56 during the cut.

The spring 84 about rod 81 applies a constant force biasing the frame 26 so as to move the frame 26 laterally of the conveyor C. However, the lateral position of the arm 56b connected to the frame 14 is determined not only by the relative position of the stop button 90. The stop button 90 is automatically adjusted by means of the cam lever 92 pivoted to the main frame F and carrying the cam roller 95. As the scribe saw shoe 54 changes elevation, the frames 14, 16 also change elevation which in turn actuates the stop button 90 through arm 96 to control the horizontal location or lateral position of the arm 56b, thus controlling the fat thickness left on the tail end of the loin. Normally, the heavier the side S is, the thicker the fat back.

In the device shown in U.S. Pat. No. 3,546,737, the cut at the end of the loin was relatively straight as indicated in FIG. 8. As a result of cooperation of the stop button 90 and the biased lateral movement of the carriage means comprising frames 14, 16 and 26 to squeeze the upper portions of the arms 56a and 56b toward one another in a controlled fashion, the loin pull knife 56 may be moved from the solid line position shown in FIG. 7 to the respective dotted line positions indicated in order to provide the cuts on the loin illustrated in FIG. 8. Thus, toward the end of the loin cut, the frames 14, 16 will be lowered and the stop button 90 will be moved to the left, as viewed for example in FIG. 7, to permit the knife portion 56b to move further to the left to assume the position indicated at dotted line with the leg and "shape of knife at start of loin cut and toward end of cut." By virtue of the spring pressure applied to the frame 26 through the spring 84 and the cooperative effect of spring 64 biasing the squeeze bracket weldment, the arm portion 56b will be maintained in contact with the stop button 90. The result of this action will be a new, narrower cut at the tail end than was heretofore possible. Such cut will optimize the size of the loin, providing maximum grading of the loin, without downgrading the remainder of the animal side.

When the side S has tripped the switch wire 130 to close the switch SW1, the loin drive drum 140 is automatically forced down on the already cut portion of the loin still lying on the top of the remainder of the side S in order to help pull the entire side through the loin pull mechanism and unto the next station of the machine PM. This is accomplished through a cylinder 142 also actuated by the switch SW1 and the solenoid valve SV1. The cylinder 142 normally keeps the drum 140 raised by flow of compressed air from outlet 2 of the valve SV1. Pressure regulator PR5 is associated with cylinder 142.

After the side S has passed by the wire loop switch actuator 130 and the actuator 130 has returned to its normal position, the cylinder 74 which controls the two positions of the saw 50 and the knife 56 automatically returns the saw and knife to their respective starting positions through the action of the switch SW1 and the solenoid valve SV1. At the same time the loin drive drum 140 is raised through the action of the same switch and valve.

In an emergency, the machine operator can raise (and later lower) the gripper chain rider arm 124, the gripper chain 122, the saw 50 and shoe 54 and the drum 140 pneumatically by closing (and later opening) the jam valve J.

After the loin has been pulled from the animal side, the side S (now in two pieces) proceeds on the conveyor C toward the loin push-off operation. The loin push-off operation does not form any part of the present invention and is, therefore, not further described herein. Reference for this and subsequent operations on the animal side may be found in said U.S. Pat. No. 3,546,737. It will be understood that the loin knife mechanism of this invention may be substituted for that shown in said U.S. Pat. No. 3,546,737. Alternatively, it can be employed with modifications thereof or in different processing machines. For example, this invention would be used with a processing machine incorporating the improved rib cutting mechanism shown in U.S. application Ser. No. 178,914 filed Sept. 9, 1971 by the same inventors as herein.

There has been provided by the present invention an improved animal side processing machine having a novel loin pull mechanism incorporating a U-shaped loin pull knife, with means for urging or squeezing the ends of the loin pull knife toward one another in operation so as to provide for a narrower cut of the animal side at the tail end and thereby optimize the loin cut from the animal side. The improved results are attained by utilizing a cylinder and spring for moving the carriage means laterally of the direction of conveyor travel in use. The compression spring on the cylinder provides a cushioned force to move the loin pull knife laterally. The operation of the cylinder is timed with the knife turning action so as to squeeze the two arm portions of the loin pull knife together, making it narrower and thus cutting the animal side narrower at the tail end. The spring of the cylinder acts as a shock absorber and provides for a smoother build-up of the side force which tends to squeeze the loin knife during the cutting operation.

While there has been shown a presently preferred embodiment of the invention, it will be obvious to those skilled in the art that the invention is not so limited, since it may be otherwise embodied within the scope of the following claims.

We claim:

1. In an animal side processing machine, main frame means, conveyor means on said main frame means operable to convey animal sides through the machine, a loin pull mechanism comprising carriage means, a generally U-shaped loin pull knife, said carriage means including a first frame, supporting one arm portion of the loin pull knife, a second frame supporting a second arm portion of the loin pull knife, said second frame being pivoted on the first frame about an axis generally at right angles to the plane of said conveyor means, first control means adapted for raising and lowering the carriage means to follow the contour of the backbone of the animal side, and second control means for pivoting the first frame relative to the second frame to properly angle said loin pull knife during the loin pulling operation, the improvement characterized by the carriage means including a third frame supporting the first frame for movement transverse to the direction of conveyor travel, means for moving the third frame relative to the main frame means, and means for actuating said moving means at a preselected time during the loin pull operation to cause the arm portions of the loin pull knife to be moved toward one another and provide a suitable cut on said loins.

2. An animal side processing machine as in claim 1 including third control means on the main frame means operable in response to the position of the carriage means to control the lateral position of an arm portion of the loin pull knife.

3. An animal processing machine as in claim 2 wherein the actuating means comprises a fluid cylinder operative between the main frame means and third frame for moving the third frame and the second and first frames carried therewith to cause said one arm portion of the loin pull knife to abut the third control means and said second arm portion of the loin pull knife to be moved laterally relative therto so as to squeeze the arm portions of the loin pull knife.

4. An animal side processing machine as in claim 3 wherein a spring is operative between the cylinder and the third frame.

5. An animal side processing machine as in claim 4 wherein the actuating means includes a cylinder rod extending from the fluid cylinder which is secured to the main frame means, the cylinder rod having a spring thereon, a projection on the third frame cooperating with the spring, whereby movement of the cylinder rod will compress the spring and bias the third frame so as to squeeze the arm portions of the loin pull knife during the loin pulling operation.

6. A animal side processing machine as in claim 1 wherein the third frame includes means for guiding the first frame and the second frame carried therewith for movement toward and away from the path of travel of the conveyor means in response to the first control means.

7. An animal side processing machine as in claim 6 including means for stabilizing the lateral movement of the third frame, said stabilizing means including cross rod means journalling a portion of the third frame.

8. An animal side processing machine as in claim 7 wherein the stabilizing means include rollers for guiding a portion of the third frame.

9. The machine of claim 1 including a scribe saw mounted on said second frame of said carriage means.

10. In an animal side processing machine, main frame means, conveyor means on said main frame means operable to convey animal sides through the machine, a loin pull mechanism comprising carriage means carrying a scribe saw and a generally U-shaped loin pull knife, said carriage means including a first frame, supporting one arm portion of the loin pull knife, a second frame supporting the scribe saw and a second arm portion of the loin pull knife, said second frame being pivoted on the first frame about an axis generally at right angles to the plane of the conveyor surface conveying the animal sides, first control means adapted to follow the contour of the backbone of the animal side for raising and lowering the carriage means and second control means for pivoting the first frame relative to the second frame to properly angle the scribe saw and loin pull knife during the loin pulling operation, the improvement characterized by the carriage means including a third frame supporting the first frame for movement transverse to the direction of conveyor travel, and actuating means for moving the third frame relative to the main frame means, the actuating means being moved in timed relationship to the second control means to squeeze the arm portions of the U-shaped knife in synchronization with the pivoting of the second frame relative to the first frame so as to provide a suitable cut on said loins.

* * * * *